June 25, 1963

W. G. GREEN 3,095,365

WATER CONDITIONING APPARATUS

Filed Oct. 4, 1961

INVENTOR.
WILLIAM G. GREEN
BY
Roy E. Raney
ATTORNEY

June 25, 1963

W. G. GREEN 3,095,365

WATER CONDITIONING APPARATUS

Filed Oct. 4, 1961

INVENTOR.
WILLIAM G. GREEN
BY
*Roy E. Raney*
ATTORNEY

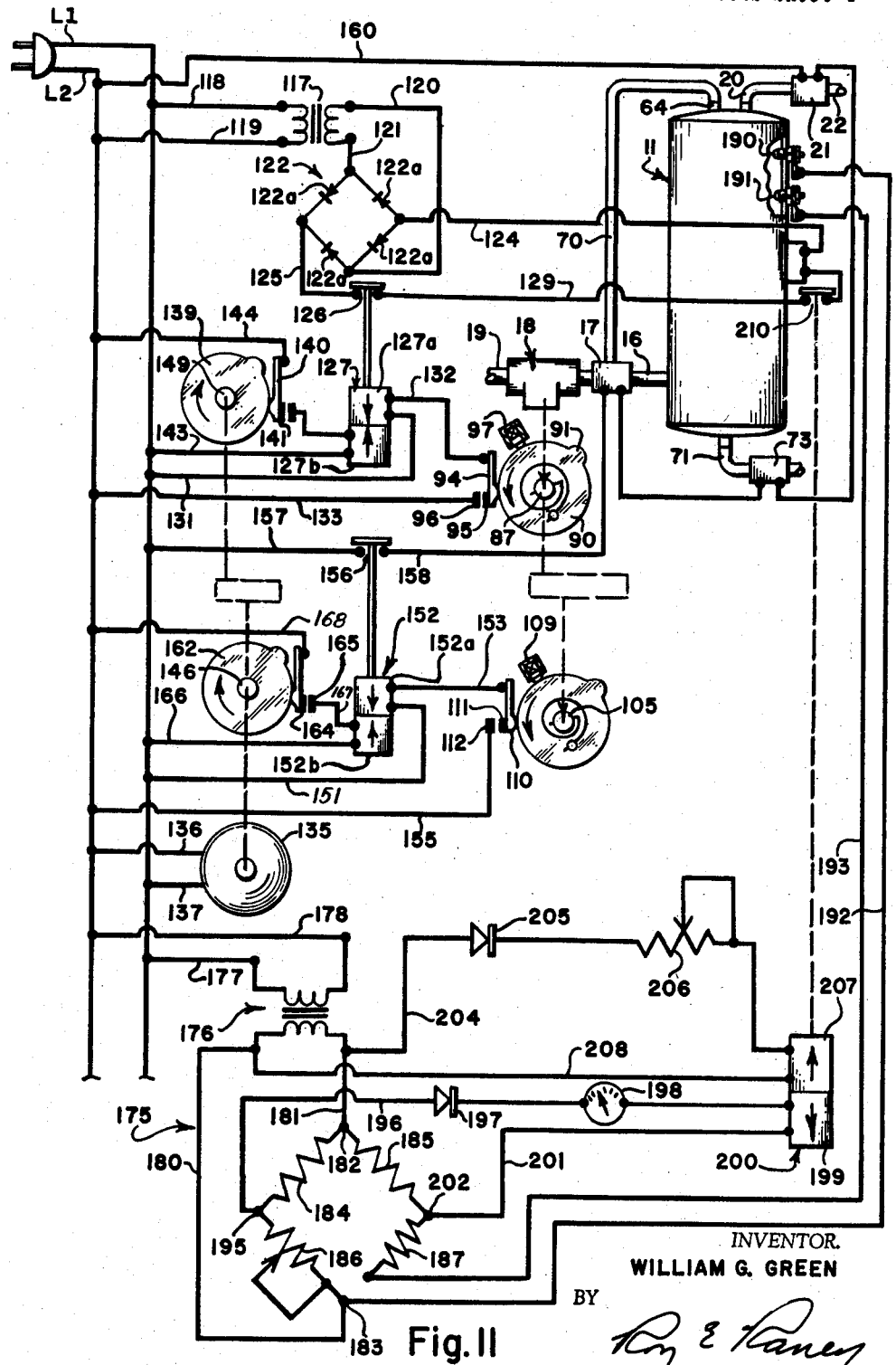
Fig. II

United States Patent Office 3,095,365
Patented June 25, 1963

3,095,365
WATER CONDITIONING APPARATUS
William G. Green, St. Petersburg, Fla., assignor, by mesne assignments, to Aquatron Engineering Corp., St. Petersburg, Fla., a corporation of Florida
Filed Oct. 4, 1961, Ser. No. 142,851
5 Claims. (Cl. 204—229)

This invention relates to improvements in water conditioning apparatus for treating impure water so as to render it more suitable for domestic and industrial uses. More particularly, the invention is directed to improved water treating apparatus having carbon and aluminum electrodes between which the water to be treated is passed and subjected to a current flow so as to produce in the water a flock or agglomeration of aluminum hydroxide precipitate and also to produce in the water a quantity of carbon dioxide, the carbon dioxide acting on limestone scale previously deposited in a system using the treated water to form calcium bicarbonate which is dissolved and frees other deposits which may be adsorbed or entrapped by the aluminum hydroxide so as to be precipitated from the water, the apparatus comprising a sump area in which the precipitate is collected as sludge for periodic removal by an automatic flushing control system which is adapted to be initiated in response to the passage of a predetermined quantity of water through the apparatus, the control system also serving to interrupt the flow of electric current between the electrodes during periods of non-use of the water from the apparatus.

It is an important object of this invention to provide water treating apparatus of the above-mentioned character wherein the control system comprises switch means operated by a rotary blade turned by the flow of water passing through the apparatus, and switch means operated by a timing motor, the water and timer operated switches cooperating to control energization of the electrode power supply and also cooperating to control energization of solenoid operated valve means for directing a reverse flow of flushing water through the apparatus to drive precipitated impurities out through a sump drain.

Another important object of this invention is the provision of a filter section for removing particles of impurities from the water by filtering, and the provision of a gas trapping and removing means disposed between the electrode section of the apparatus and the filter section, so as to prevent absorption of the gas into the filter and reduction of the efficiency thereof.

Still another object of this invention is the provision of a water purity sensing circuit which is utilized to indicate the state of purification of the water and may be utilized to interrupt the energization of the water treating electrodes when the water has been purified to a predetermined degree.

Other objects and advantages of the present invention will become apparent from the following detailed description of water treatment apparatus embodying the invention taken in conjunction with the accompanying sheets of drawings forming a part of this specification, and in which FIG. 1 is a view, partly in section, of water treating apparatus embodying the present invention.

FIG. 11 is a schematic illustration of the control system.

Figure 1:
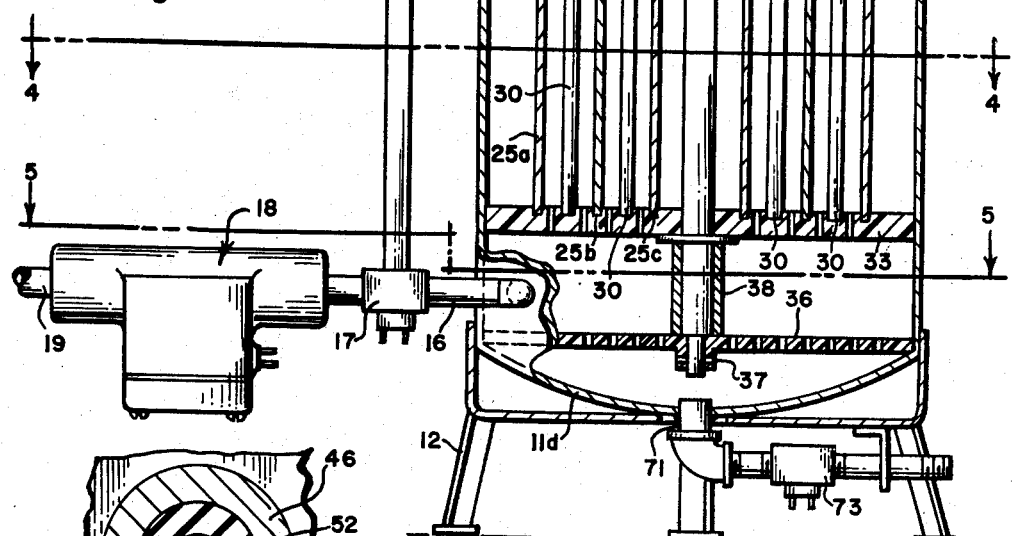
Figure 2:
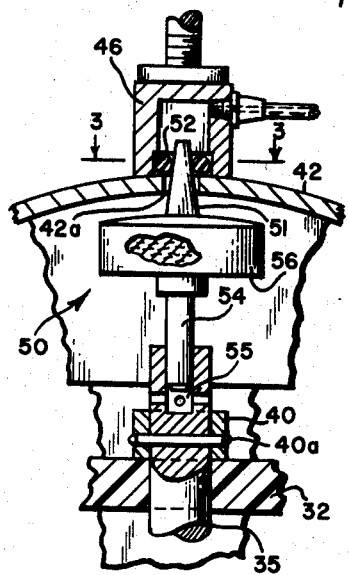
FIG. 2 is an enlarged fragmentary view of a portion of the apparatus of FIG. 1.
Figure 3:
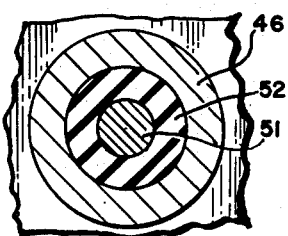
FIG. 3 is a sectional view taken along line 3—3 of FIG. 2.
Figure 4:
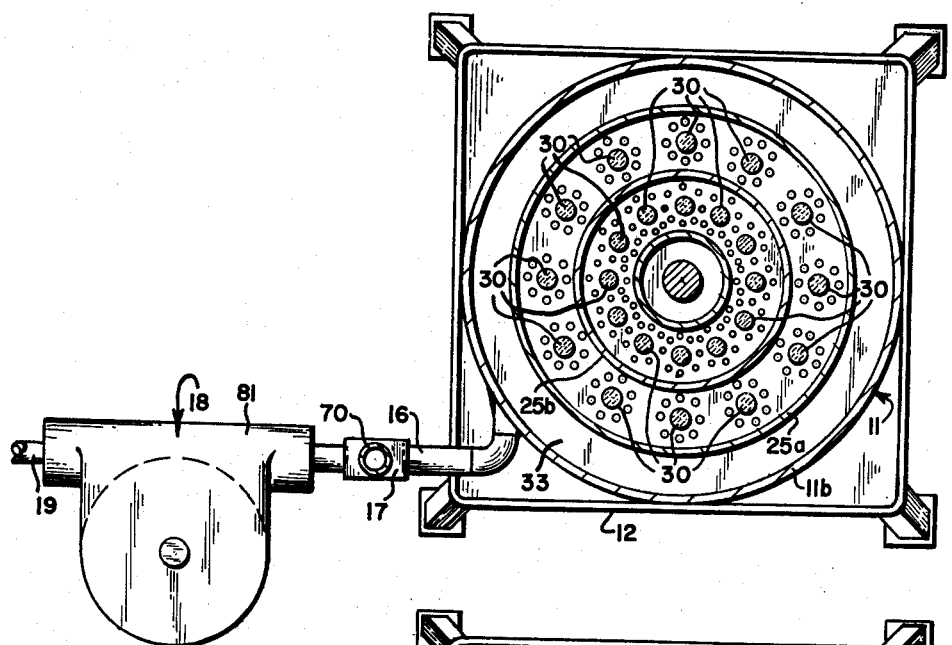
FIG. 4 is a sectional view taken along line 4—4 of FIG. 1.
Figure 5:
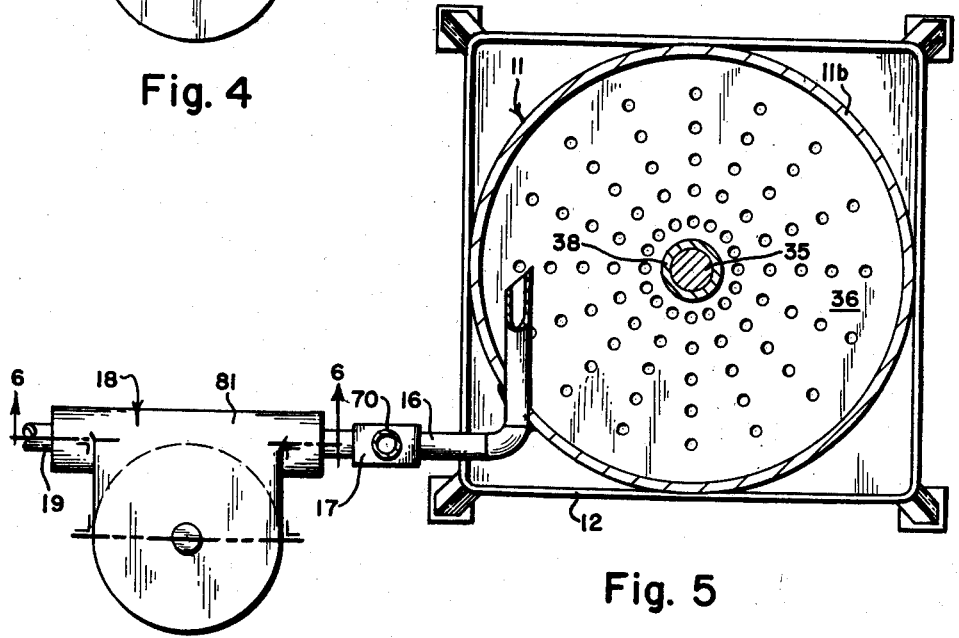
FIG. 5 is a sectional view taken along line 5—5 of FIG. 1.
Figure 6:
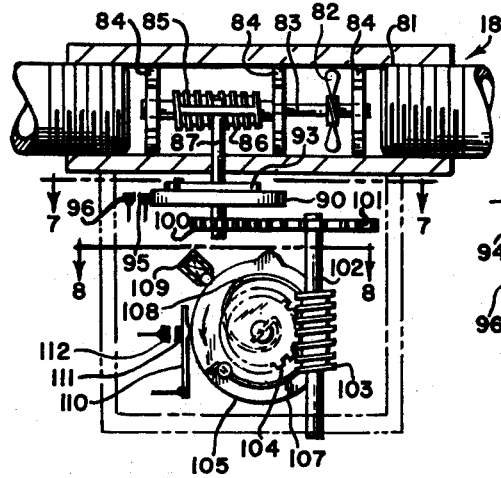
FIG. 6 is an enlarged sectional view taken substantially along line 6—6 of FIG. 5.
Figure 7:
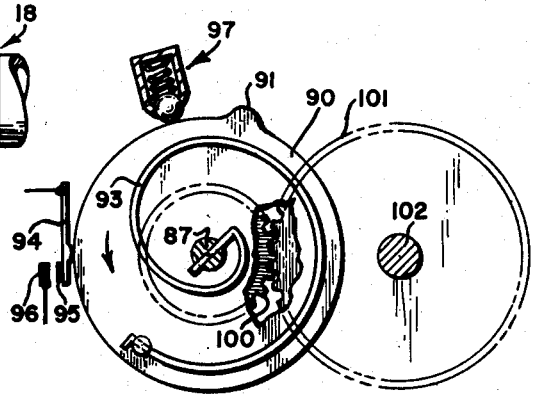
FIG. 7 is an enlarged sectional view taken along line 7—7 of FIG. 6.

This application is a continuation in part of my co-pending application Serial No. 743,249, filed June 20, 1958, now abandoned.

While the present apparatus may be used in the automatic purification of water which is consumed and not returned to the apparatus, it is particularly adapted to those systems wherein the water is returned to the purifying apparatus in a more or less continuous cycle, for example in connection with boiler water supplies, water supplies for cooling towers of air conditioning installations, and the like. Accordingly, the invention will be described with reference to use in a circulating system such as the water tower just mentioned, although the particular water tower, boiler, or the like with which the apparatus may be associated forms no part of this invention.

Referring now to FIGS. 1 through 5, there is illustrated therein a water treating apparatus 10 which is seen to comprise a tank like structure 11, hereafter referred to simply as tank 11, and which is supported by a suitable stand 12. Tank 11 is generally cylindrical and is formed of upper and lower sections 11a and 11b respectively, which have mating flanges 13 and 14 secured together by suitable bolts 15. Tank 11 is provided with a convex top portion 11c and a convex bottom portion 11d the latter providing a cup-shaped sump area. A water inlet pipe 16 extends through the wall of tank 11 near the bottom thereof and serves to admit water returning from the cooling tower, not shown, and make up water for replacing that evaporated in the cooling tower, the water being admitted through pipe 16 by a three way, solenoid operated control valve 17. Valve 17 has its inlet side connected to a water flow powered control device 18 which is in turn connected to return pipe 19 leading from the cooling tower. A water outlet 20 is provided in the top 11c of the tank and is connected by suitable fittings to a normally open solenoid valve 21 which is adapted, when energized, to prevent the flow of water from tank 11 through a pipe 22 leading to the mentioned cooling tower or other apparatus.

Within lower tank section 11b there are provided a plurality of concentric, spaced, cylindrical aluminum electrodes 25a, 25b and 25c, and a plurality of rod-like carbon electrodes 30 arranged in circular pattern between the aluminum electrodes. The aluminum electrodes and the carbon electrodes 30 are supported at their upper and lower ends by disc-like insulating members 32 and 33 having suitable recesses for receiving the ends of the electrodes. Discs 32 and 33, which are preferably formed of phenolic resin material, are in sliding engagement with the inner surface of tank portion 11b and have center openings through which a post 35 extends. The lower end of post 35 is of reduced diameter and is received in a central opening in a circular perforated member 36, the outer edge of which rests upon tank bottom 11d. The end of post 35 is retained in disc 36 by a pin 37 and the portion of the post adjacent disc 36 is surrounded by a tubular spacer member 38. The electrode supporting disc 33 rests on spacer member 38, while upper insulating disc 32 is held in clamping relation to the upper end of the electrodes by a bushing 40 surrounding the upper end of post 35 and secured thereto by a pin 40a. Insulating discs 32 and 33 are provided with circular patterns of apertures 41 surrounding the ends of electrodes 30 and serve to permit the passage of water from inlet 16 upwardly between the aluminum and carbon electrodes to be subjected to electric current flowing therebetween as will later be more fully described.

Above the insulating disc 32, there is provided a gas collecting dome 42 having downwardly extending studs 43 secured in sleeves 44 distributed about the periphery of the dome, and which studs project into openings in disc 32 and have shoulders 43a resting against the disc. Dome 42 serves to collect gasses such as hydrogen and oxygen generated by electrolysis of the water at the electrodes 25 and 30, and has a central outlet opening 42a leading to the interior of a hollow fitting 46 mounted on top of the dome and the interior of which is in communication with the exterior of tank 11 through suitable interior piping 47 and exterior piping 48, the latter being open to the atmosphere and serving to vent gasses passing from dome 42 into fitting 46. The venting of such gasses is controlled by a floating valve, generally indicated at 50 and best illustrated in FIGS. 2 and 3, and which comprises a tapered valve element 51 extending upwardly into fitting 46 and adapted to sealingly engage an annular valve seat in the form of a resilient O-ring 52 in fitting 46. Tapered valve element 51 has a depending stem 54 extending into a guide bore 55 in the upper end of post 35, there being bleed openings provided to bore 55 as shown to permit ready movement of stem 54 therein. A valve float 56 is secured on valve stem 54 below valve element 51, so that when dome 42 is substantially filled with water the float will cause the valve assembly 50 to maintain valve element 51 in sealing engagement with O-ring 52. However, when sufficient gasses collect in dome 42 to lower the level of water therein, float valve assembly 50 will also be lowered withdrawing valve element 51 from O-ring 52 and permitting accumulated gasses to be vented through fitting 46, piping 47 and vent pipe 48 to the atmosphere. The venting of the gasses will cause the water level in dome 42 and the float valve assembly 50 to rise until valve element 51 again makes sealing engagement with O-ring 52.

The upper tank portion 11a contains a stack of disc-like filter elements 60 which are sandwiched between a pair of perforated upper and lower metal discs 62 and 63, and have their peripheral edges in engagement with the inner surface of tank portion 11a. The filter discs 60 and the perforated plates 62 and 63 have aligned central openings receiving a perforated nipple or pipe 64 which extends through tank top 11c and is secured at its lower end to a plug 65. A washer 64a is welded to perforated pipe 64 and forms a shoulder above plate 62. Plug 65 has an upwardly extending bore loosely receiving a special screw 66, the head of which rests on gas outlet fitting 46 as shown. A nut 67 on screw 66 provides firm support for the filter discs 60, and the nut 67 may be moved upwardly or downwardly with respect to screw 66 as necessary to clamp the plates 62, 63 and the filter discs 60 between washer 64a and nut 67 when the apparatus is assembled.

Water rising upwardly around the periphery of gas collecting dome 42 after being subjected to treatment by the electrodes, will be forced through the perforations of metal disc 63 and will be filtered by filter discs 60 to remove particles of impurities and aluminum hydroxide therefrom prior to leaving the apparatus 10 through outlet 20 and pipe 22.

The end of perforated nipple 64 which extends through tank top 11c is connected by simple piping 70 to the second outlet of three-way valve 17 and forms part of the back flushing system for reversing the flow of water through the filter discs 60, down through the electrodes, and out a back flushing discharge outlet formed by a pipe 71 opening in the center of the sump area formed by bottom wall 11d of the apparatus 10. The flow of flushing water and precipitated impurities or sludge from the bottom area of the tank out pipe 71 is controlled by a normally closed solenoid valve 73 which is actuated simultaneously with solenoid valves 17 and 21 by a control system described more fully hereinafter.

The control system of this invention operates to control the periodic backflushing of the apparatus 10 and the energization of the electrodes 25 and 30 in accordance with the quantity of water passed through the apparatus and includes timing means for interrupting the backflushing and electrode energization at predetermined intervals so as to avoid needless waste of water and electric power during periods of idleness as will become apparent as the description proceeds.

Referring now to FIGS. 6 through 11, the control system for apparatus 10, which includes flow meter mechanism 18, will be described. Flow meter 18 comprises a tubular casing 81, which serves as a conduit for supply water, and has mounted therein a helical blade 82 attached to a shaft 83 supported for rotation by bearing struts 84, and having a worm gear 85 secured to the shaft for rotation therewith. It will be recognized that water flowing through casing 81 will act on blade 82 causing the shaft and worm gear 85 to rotate at a speed which is, for practical purposes, proportional to the rate of flow through the casing. A worm wheel 86 is engaged by worm 85 and is secured on the end of a drive shaft 87 which is suitably journaled in the wall of casing 81. Drive shaft 87 is rotated by the worm and worm wheel at a reduced rate with respect to shaft 83, the rotation of shaft 87 being on the order of one revolution for each 50 gallons of water passing through the flowmeter 18.

Rotatably mounted on shaft 87 is a cam 90, formed of insulating material and having a cam lobe 91 formed on the periphery thereof. A flat coil spring 93 is connected at one end to shaft 87 and at its other end to cam 90 and serves as a resilient coupling tending to rotate the cam with the shaft 87. A cam operated switch arm 94 carries a movable contact 95 and is adapted to be moved by passage of cam lobe 91 to bring contact 95 momentarily in engagement with a fixed contact 96. A spring loaded ball type detent 97 is arranged to be engaged by lobe 91 so as to arrest rotation of the cam in a position just prior to engagement of arm 94 by lobe 91 while shaft 87 continues to turn and tends to wind up spring 93 until the resistance offered by detent 97 is overcome, at which time spring 93 unwinds and rotates cam 90 so as to bring lobe 91 rapidly past the arm 94 making momentary electrical engagement between contacts 95, 96. This construction and operation prevents the possibility of the lob 91 stopping under the arm 94 in the event flow of water through flowmeter 18 ceases. Contacts 95, 96 are connected into a circuit for energizing the electrodes 25 and 30 in a manner which will presently be made apparent.

Shaft 87 is also connected to reduction gearing means which, by way of example, comprises a pinion 100 mounted on shaft 87, a driven gear 101 mounted on a shaft 102 carrying a worm gear 103 which is in driving engagement with a worm wheel 104 mounted on an output shaft 105. The relationship of the gears is so chosen that the output shaft 105 will make one revolution for approximately each 10,000 gallons of water passing through flowmeter 18.

A cam 107, similar to cam 90, is mounted on shaft 105 and connected thereto by spring 108 for cooperation with a detent 109, switch arm 110, and contacts 111 and 112 in the same manner as the detent, arm, and contacts associated with cam 90. Contacts 111, 112 control the initiation of a back flushing operation in apparatus 10 in response to the passage of a predetermined amount of water therethrough which, in the present example, is equal to the 10,000 gallons required to make one revolution of output shaft 105, and hence, of cam 107.

In the control circuit illustrated in FIG. 11 power is derived from the suitable source such as 110 v. A.C., by a plug connecter 115 having terminals connected to lines L1 and L2 through which power is provided to the remaining parts of the circuit. A transformer 117 has its primary winding connected to power lines L1 and L2 by conductors 118 and 119, and has its secondary winding connected by conductors 120 and 121 to opposite sides of a conventional full wave rectifier bridge generally indicated at 122. Transformer 117 and rectifier 122 convert the supplied current to direct current having a potential of approximately 30 v. between conductors 124 and 125, the former being connected to carbon electrodes 30 and the latter leading to one side of contacts 126 of a latching type relay 127. The other side of contacts 126 are connected by a conductor 129 to the aluminum electrodes 25.

The rectifier elements 122a of rectifier bridge 122 are so oriented that the carbon is positively charged while the aluminum is negatively charged. That is to say, an excess of electrons exist at the aluminum electrodes 25 and a flow of electron current will exist from the aluminum electrodes towards the carbon electrodes through impure water disposed therebetween when contacts 126 of relay 127 are closed. Latching relay 127 is of the type having a closing solenoid 127a and an opening solenoid 127b. Solenoid 127a is adapted to be energized to close contacts 126 upon completion of a circuit completed upon momentary closing of contacts 95 and 96 in response to passage of water through flow meter 18. This circuit may be traced from power line L1 through a conductor 131, solenoid 127a, conductor 132, contacts 95 and 96, and a conductor 133 to power line L2. Latching relay 127 will keep contacts 126 closed until solenoid 127b is energized, and, this is accomplished at regular timed intervals, for example twenty-four hours, so that electrodes 25 and 30 will be deenergized thereafter until water is drawn from the apparatus 10 and causes flow meter 18 to actuate contacts 95 and 96 to energize solenoid 127a and reclose contacts 126.

The periodic energization of solenoid 127b is effected by means including a timer motor 135, preferably of the synchronous clock type motor, energized through conductors 136 and 137 from power lines L1 and L2, and connected through suitable gear reduction means to drive a cam 139. Cam 139 is arranged to move a contact arm 140 to bring a contact 141 carried thereby into engagement with a fixed contact 142. Closing of contacts 141, 142 serves to complete a circuit which may be traced from power line L1 through a conductor 143, solenoid 127b, contacts 141 and 142, and a conductor 144 to power line L2. It will be recognized that closing of this circuit will cause contacts 126 to be opened to deenergize electrodes 25 and 30.

Figure 8:
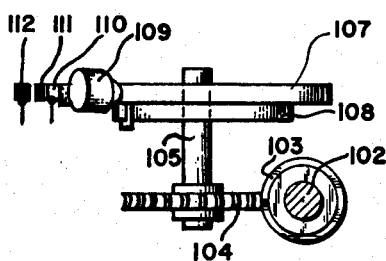
FIG. 8 is a sectional view taken along line 8—8 of FIG. 6.
Figure 9:
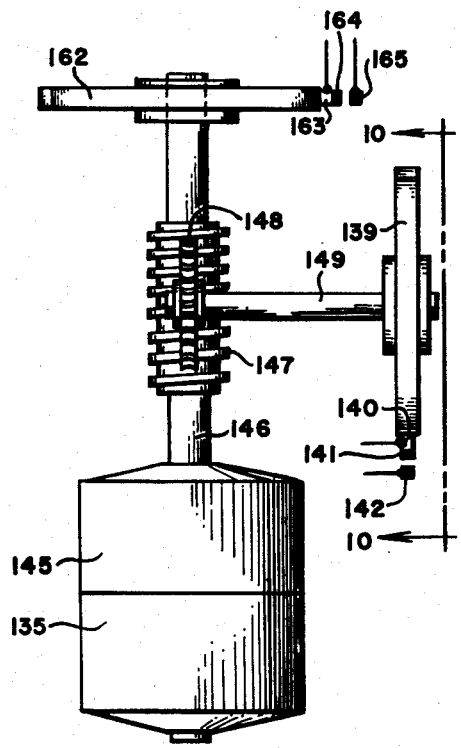
FIG. 9 is a schematic illustration of a portion of the control system for the apparatus of FIG. 1.
Figure 10:
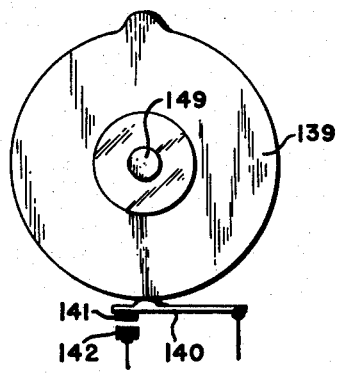
FIG. 10 is a sectional view taken along line 10—10 of FIG. 9.

The gear reduction means for driving cam 139 from motor 135 are best shown in FIGS. 8 and 9, and comprise a gear head 145 attached directly to the motor and providing rotation of a shaft 146 on the order of one turn every two minutes. Shaft 146 carries a worm gear 147 engaged with a worm wheel 148 to provide rotation of a shaft 149 at a rate on the order of one turn each twenty four hours. Cam 139 is mounted for rotation with shaft 149 and hence serves to operate contacts 141, 142 as described above. It will be understood, of course, that the described gearing is given only by way of example and that any well known combination of gears of various sizes may be utilized between motor 135 and cam 139 to provide the desired rotation.

Prolonged operation of the apparatus 10, such as when flow meter 18 has experienced a flow of approximately 10,000 gallons, will result in an accumulation in the filter disc 69 and in the sump area of tank 11 of impurities removed from the water so that it is desirable to back flush the apparatus. Accordingly, contacts 111 and 112 associated with cam 107, are adapted to complete a circuit for initiating a back flushing cycle in the apparatus. This circuit may be traced from power line L1 through a conductor 151, a closing solenoid 152a of a latching relay 152, a conductor 153, contacts 111 and 112, and a conductor 155 to power line L2. Energization of solenoid 152a closes contacts 156 of latching relay 152 completing a circuit which may be traced from power line L1 through a conductor 157, now closed contacts 156, a conductor 158, three way solenoid valve 17, the solenoid of valve 21, the solenoid of valve 73, and a conductor 160 to power line L2.

Energization of three way solenoid valve 17 shifts the influx of water from inlet pipe 16 to back flushing pipe 64, while energization of solenoid valve 21 closed the normal outlet through pipe 20 and energization of solenoid valve 73 opens the sump drain outlet 71. Water therefore enters the apparatus through back flushing pipe 64 causing a reverse travel of water through the filter discs 69, down between the electrodes 25 and 30, gathering material removed thereby in the sump area for forceful removal through outlet 71. Contacts 156 of latching solenoid 152 will remain closed for a predetermined period of time after which solenoid 152b will be energized to open contacts 156 and terminate the back flushing operation. Solenoid 152b is energized periodically by operation of a cam 162 which is mounted on shaft 146 so as to be driven by timer motor 135 and acts on a contact arm 163 to bring a movable contact 164 into engagement with a fixed contact 165 to complete a circuit which may be traced from power line L1 through a conductor 166, solenoid 152b, a conductor 167, contacts 164 and 165, and a conductor 168 to power line L2. Cam 162 is rotated by shaft 146 at a rate which will energize solenoid 152b momentarily at intervals of two minutes, for example, so that the back flushing operation through the apparatus 10 will never exceed two minutes.

Of course, it will be recognized that the amount of water required to pass through flow meter 18 to actuate circuits for energizing the electrodes and for initiating the back flushing operation, as well as the time intervals determined by the cam operated switches driven by motor 135, are exemplary only and may be varied to suit the needs and capacities of the water treating apparatus 10 in the system in which it is installed.

The control means illustrated in FIG. 11 also comprises a water purity sensing circuit which is utilized to indicate the state of purification of the water and also to interrupt the energization of the electrodes 30 and 35 whenever the water has been purified to a predetermined degree. This sensing circuit portion of the control means of this invention is generally indicated at 175 and comprises a transformer 176 having its primary windings connected by wires 177 and 178 to power lines L1 and L2. The secondary winding of transformer 176 is connected by wires 180 and 181 to opposite junctions 182 and 183 of a resistance bridge comprising fixed resistors 184 and 185 forming legs joined at 182, a variable resistance 186 forming another leg, and a fixed resistor 187 forming part of the last leg. A pair of sensing electrodes 190 and 191 are connected by wires 192 and 193 between resistor 187 and junction 183 so that the resistance of the water between electrodes 190 and 191 is introduced into one leg of the resistance bridge. A circuit may be traced from a junction 195 between resistors 184 and 186, through a wire 196, a rectifier diode 197, a milliammeter 198, the closing coil 199 of a differential relay 200, and a wire 201 to a junction 202 between resistors 185 and 187. Another circuit may be traced from one end of the secondary winding of transformer 176 through a wire 204, a rectifier diode 205, a variable resistor 206, the opening winding 207 of relay 200, and a wire 208 to the other end of the transformer secondary.

It will be recognized that if resistor 186 is adjusted to give a zero reading at ammeter 198 when electrodes 190 and 191 are disposed in pure water, thereafter when the upper part of cylinder 11 contains water having substantial ionic impurities therein, the resistance between electrodes 190 and 191 will be reduced thereby unbalancing the bridge and causing a current to flow through ammeter 198 and through relay winding 199. This current tends to close contactor 210 of relay 200, and the amount of current necessary to effect closing thereof may be selected by adjustment of resistor 206 which controls the amount of current passing through opening winding 207 and opposing the action of the closing winding. With contactor 210 closed, electrodes 30 and 35 may be energized to provide their purifying action on the water passing through the apparatus in the manner described heretofore. However, as the purity of the water increases the resistance between electrodes 190 and 191 increases proportionately and the current flowing through meter 198 and winding 199 decreases proportionately. When the water reaches a predetermined state of purity, the difference in current flow between winding 199 and winding 207 of relay 200 will be insufficient to maintain contacts 210 closed, and hence these contacts will open and interrupt the energization of electrodes 30 and 35.

The just described purity sensing circuit precludes the wasting of electrical power when the water in the system has been reduced to a desirable degree of purity and, the meter 198 provides a continuous visual presentation of the state of purity of the water at any time. In addition, the electrodes 190 and 191 may be made of gold and/or silver from which small quantities of ionic gold and silver are dispersed in the water by the action of the alternating current flowing therebetween. The $Ag^+$ and $Au^+$ ions serve as bactericidal agents in the water treated. Moreover, the use of alternating current between the sensing electrodes maintains them clean and active, so that removal thereof is not necessary except for periodic replacement.

Although the invention has been described in considerable detail with reference to a preferred water treating apparatus embodying the invention, it will be understood that the invention is not limited thereto, but rather the invention includes all those modifications, adaptations, and uses as are embraced by the scope of the claims hereof.

Having described my invention, I claim:

1. In a water treating system including apparatus having electrodes supplied with current by an electrode power supply circuit and provided with solenoid valves for reversing the flow of water through the apparatus, a first latching relay having first and second operative positions and connected in said power supply circuit for respectively energizing and deenergizing said electrodes, a second latching relay having first and second operative positions and connected for respectively energizing and deenergizing said solenoid valves, rotary means disposed in the water supply line and adapted to provide rotation of a shaft at a rate proportional to the flow of water through the apparatus, a first switch means actuated by rotation of said shaft corresponding to a first predetermined amount of water through said apparatus, said first switch means connected to operate said first latching relay to cause energization of said electrodes, a second switch means actuated by rotation of said shaft corresponding to a second predetermined amount of water through said apparatus so as to operate said second latching relay to reverse the flow of water through the apparatus, and timer actuated switch means for periodically actuating said relays to their first positions so as to respectively deenergize said electrodes and said solenoid valves until said predetermined quantities of water again flow through said apparatus.

2. In a water treating system including apparatus having electrodes supplied with current by an electrode power supply circuit and provided with solenoid valves controlling piping for reversing the flow of water through the apparatus, a first latching relay having first and second operative positions and connected in said power supply circuit for respectively energizing and deenergizing said electrodes, a second latching relay having first and second operative positions and connected for respectively energizing and deenergizing said solenoid valves, rotary blade means disposed in the water supply line and adapted to provide rotation of a shaft at a rate proportional to the flow of water through the apparatus, a first switch means actuated by rotation of a first cam on said shaft corresponding to a first predetermined amount of water passing through said apparatus, said first switch means operative to cause said first latching relay to energize said electrodes, a second switch means actuated by rotation of a second cam on a second shaft corresponding to a second predetermined amount of water through said apparatus so as to operate said second latching relay to reverse the flow of water through the apparatus, and third and fourth switch means actuated by timing means so as to periodically actuate said first and second relays respectively to their first positions so as to respectively deenergize said electrodes and said solenoid valves until said predetermined quantities of water again flow through said apparatus.

3. In a water treating system as defined in claim 2, said first cam being mounted for rotation with respect to said first shaft, spring means resiliently urging said first cam to rotate with said first shaft, and detent means arranged to interrupt rotation of said first cam, said spring being adapted to overcome said detent means upon predetermined rotation of said first shaft with respect to said first cam so that the latter is rotated by said spring means to effect momentary actuation of said first switch means.

4. In a water treating system as defined in claim 3, said second cam being mounted for rotation with respect to said second shaft, second spring means resiliently urging said second cam to rotate with said second shaft, and second detent means arranged to interrupt rotation of said second cam, said second spring being adapted to overcome said second detent means upon predetermined rotation of said second shaft with respect to said second cam so that the latter is rotated by said second spring means to effect momentary actuation of said second switch means.

5. In a water treating system including apparatus having electrodes supplied with current by an electrode power supply circuit and provided with valves positionable to provide normal and reverse flow of water through the apparatus, water powered means disposed in the water supply line and adapted to provide movement of a shaft proportional to the flow of water through the apparatus, contact means for controlling energization of said electrodes, valve controlling means connected between said shaft and said valve means, said contact means being actuated to energize said electrodes by movement of said shaft corresponding to flow of a first predetermined amount of water through said apparatus, said valve controlling means being actuated to reverse the flow of water through said apparatus upon movement of said shaft corresponding to flow of a second predetermined amount of water through said apparatus, first timer actuated means for deenergizing said electrodes within a first predetermined time period unless said first predetermined amount of water flows within said first predetermined time period and second time actuated means for restoring said valves to their normal flow positions.

References Cited in the file of this patent

UNITED STATES PATENTS

| | | | |
|---|---|---|---|
| 951,313 | Hartman | Mar. 8, | 1910 |
| 1,388,613 | Simsohn | Aug. 23, | 1921 |
| 2,046,467 | Krause | July 7, | 1936 |
| 2,530,524 | Hlavin | Nov. 21, | 1950 |
| 2,689,218 | Waugh | Sept. 14, | 1954 |
| 2,846,387 | Stoddard | Aug. 5, | 1958 |
| 2,946,733 | Gaysowski | July 26, | 1960 |

FOREIGN PATENTS

| | | | |
|---|---|---|---|
| 1,227,164 | France | Aug. 19, | 1960 |